United States Patent [19]

Brunken

[11] Patent Number: 5,593,483
[45] Date of Patent: Jan. 14, 1997

[54] WATER REPELLENT COMPOSITION FOR CELLULOSE CONTAINING MATERIALS AND METHOD FOR PRODUCING SAME

[75] Inventor: Dean E. Brunken, Edmond, Okla.

[73] Assignee: Advanced Chemical Technologies, Inc., Oklahoma City, Okla.

[21] Appl. No.: 411,044

[22] Filed: Mar. 27, 1995

[51] Int. Cl.⁶ .............................. C08L 83/00; B32B 9/04
[52] U.S. Cl. .............................. 106/2; 524/544; 524/588; 427/412.2; 106/18.12; 106/287.11; 106/287.12; 106/287.13; 106/287.15; 106/287.16; 106/287.28
[58] Field of Search .................... 106/2, 287.28, 106/287.11, 287.12, 287.13, 287.15, 287.16, 18.12; 524/544, 588; 427/412.2

[56] References Cited

U.S. PATENT DOCUMENTS

| | | | |
|---|---|---|---|
| 3,462,294 | 8/1969 | Thomas | 106/287.28 |
| 4,648,904 | 3/1987 | DePasquale et al. | 106/2 |
| 5,068,132 | 11/1991 | Brunken et al. | 427/421 |
| 5,204,186 | 4/1993 | Brunken et al. | 428/447 |
| 5,302,657 | 4/1994 | Huhn et al. | 524/588 |

Primary Examiner—Melissa Bonner
Attorney, Agent, or Firm—Dunlap & Codding, P.C.

[57] ABSTRACT

A water based water repellent composition for rendering cellulose containing materials water repellent which contains, in addition to water, from about 2.5 to about 20 percent by volume of a water repellent compound compatible with the cellulose containing materials and from about 0.1 to about 1 percent by volume of a surfactant compatible with the water repellent compound and capable of enhancing the wetting properties of the water repellent compound. The water repellent compound is a fluoropolymer, an amino-functional siloxane, a self cross-linking silicone and mixtures thereof wherein the amino-functional siloxane is represented by the general formula

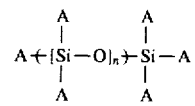

wherein Si is silicon; O is oxygen; n is a positive integer; and A is H, R or X. In the above identified formula H is hydrogen; R is an alkyl group containing from about 1 to about 30 carbon atoms, an alkenyl group, an aryl group, a cycloalkyl group, a cycloalkenyl group, an arylalkyl group, an arylalkenyl group, or any substituted group thereof wherein the cyclo substituent contains from about 4 to about 8 carbon atoms, the alkyl substituent contains up to about 8 carbon atoms and the alkenyl substituent contains up to about 8 carbon atoms; and X is a halogen, hydroxyl group, OR group wherein O is oxygen, a carboxylic group, or RNR or RNH wherein N is nitrogen with the proviso that at least one A is X, and at least one A is R.

31 Claims, No Drawings

WATER REPELLENT COMPOSITION FOR CELLULOSE CONTAINING MATERIALS AND METHOD FOR PRODUCING SAME

FIELD OF THE INVENTION

The present invention relates generally to water repellent compositions, and more particularly but not by way of limitation to water repellent compositions for cellulose containing materials. In one aspect, the present invention relates to methods for preparing such water repellent compositions and to methods for applying such water repellent compositions to cellulose containing materials.

DESCRIPTION OF THE PREFERRED EMBODIMENTS

Water repellent compositions have heretofore been applied to siliceous structures, carbon central structures and cellulose containing materials, such as wood and paper, in an effort to render such structures or materials water repellent. Several problems have been encountered in the past when applying water repellent compositions to cellulose containing materials including uneven penetration and/or bonding of the water repellent composition to the materials, unsightly darkening of treated materials upon weathering as well as the deterioration of water repellent properties of such materials due to swelling of the materials resulting from weathering.

The present invention provides water repellent compositions, methods for producing such water repellent compositions and methods for using such compositions for rendering cellulose containing materials water repellent.

The water repellent compositions of the present invention may also include a fire retardant compound, and such water repellent compositions containing a fire retardant compound may be of particular use for building materials such as wood shingles, construction lumber and railroad ties, paper books, toys, and cotton clothing.

The term "cellulose containing materials" as used herein includes, but is not limited to: wood, paper, wicker and fibers containing cellulose such as cotton and cotton blends. In the embodiment of the present invention, the water repellent composition is an aqueous based water repellent composition utilizing water as the medium or carrier and containing an effective amount of a water retardant compound compatible with the cellulose containing material and capable of bonding to such cellulose containing material so as to impart desired water repellency thereto and a minor effective amount of a surfactant compatible with the water retardant compound and capable of enhancing the wetting properties of the water retardant compound. The amount of the water retardant compound and the amount of the surfactant employed in the formulation of the water based water repellent composition of the present invention can vary widely and will be generally dependent upon the nature and properties of the water repellent compound employed, as well as the properties of the cellulose containing material to which the water based water repellent composition is to be applied. Generally, however, desirable results can be obtained wherein the amount of the water repellent compound employed in the formulation of the water based water repellent composition is from about 2.5 to about 20 percent by volume, based on the total volume of the water based water repellent composition, and the amount of surfactant employed in the formulation of the water based water repellent composition is from about 0.1 to about 1 percent by volume, based on the total volume of the water based water repellent composition.

The water retardant compound employed in the formulation of the water based water repellent composition of the present invention can be a fluoropolymer, an amino-functional siloxane, a self cross-linking silicone or mixtures thereof. Fluoropolymers which can be employed as the water retardant compound can be characterized as perfluoroalkanes or alkenes wherein all or almost all hydrogen atoms of the hydrocarbon have been replaced with fluorine atoms and includes a perfluoro alcohol/alkyl condensate such as Milease F-89 marketed by Zeneca Inc. of Wilmington, Del.

Amino-functional siloxanes which can be employed as the water retardant compound in the formulation of the water based water repellent composition of the present invention are represented by the general formula

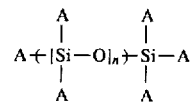

wherein Si is silicon; O is oxygen; n is a positive integer; and A is selected from the group consisting essentially of H, R or X, H is a hydrogen atom;

R is selected from the group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein O is oxygen, a carboxylic group, or RNR or RNH wherein N is nitrogen; and with the proviso that at least one A is X, and at least one A is R in the composition.

The siloxanes represented by the above defined formula and which can be employed as the water repellent compound in the formulation of the water based water repellent composition of the present invention may be a substantially pure siloxane or a mixture of siloxanes. Further, when n of the formula is greater than 1, the A group within the bracket will be repeated which will cause the H, R or X groups within the bracket to be also repeated. For example, when n=3, the formula becomes (using A' and A" to designate the repeating A groups):

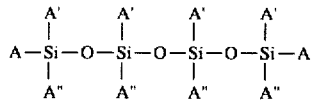

In the water retardant compound of the water based water repellent composition of the present invention, all of the A's do not have to be the same group and all of the A"s do not have to be the same group, but are selected from the groups H, R or X in any order. An example of a siloxane satisfying the above defined formula, and which can be employed as the water repellent compound in the water based water repellent compositions of the present invention is aminoethylaminopropyl dimethyl siloxane.

Self cross-linking silicones which can be employed as the water retardant compound in the formulation of the water based water repellent compositions of the present invention can be any self cross-linking silicone having organo-functional characteristics which is capable of bonding to the cellulose containing materials. An example of such a self cross-linking silicone is anionic silicone latices such as Dow Corning 84 Additive marketed by Dow Corning Corporation of Wilmington, Del.

While the above-defined fluoropolymers, siloxanes or self cross-liking silicones can be individually employed as the water retardant component of the water based water repellent composition of the present invention, especially desirable results can be obtained where the water retardant component of the water based water repellent composition is a mixture of a fluoropolymer, a siloxane and a self cross-linking silicone because each of the fluoropolymer, the siloxane and the self cross-linking silicone imparts a desirable property to the water based water repellent composition. For example, the fluoropolymer provides the water based water repellent composition with a beading effect when water is applied to a cellulose containing material treated with the water based water repellent composition containing the fluoropolymer, a property which is not only desirable, but often required, for commercial acceptance of a water repellent composition. On the other hand, the siloxane enhances the water repellent properties of the water based water repellent composition and the self cross-linking silicone possesses organo-functional characteristics which enhance the bonding of the water based water repellent composition to the cellulose containing material.

When formulating a water based water repellent composition containing a fluoropolymer, a siloxane and a self cross-linking silicone as the water retardant component, the amount of the fluoropolymer, the siloxane and the self cross-linking silicone employed as the water repellent component can vary widely. However, desirable results have been obtained wherein the water repellent component of the water based water repellent composition of the present invention comprises a mixture containing from about 1.3 to about 9 percent by volume of a perfluoro alcohol/alkyl condensate, from about 0.6 to about 5.5 percent by volume of an amino-functional siloxane and from about 0.6 to about 5.5 percent by volume of a self cross-linking anionic silicone.

The surfactant employed in the formulation of the water based water repellent composition of the present invention can be any surfactant which is compatible with the water repellent compound and which is capable of enhancing the wetting properties of the water repellent compound. However, desirable results have been obtained wherein the surfactant is an anionic surfactant, and more desirably an anionic fluorosurfactant. Examples of surfacEants satisfying the above-stated requirements and which can be employed as the surfactant in the formulation of the water based water repellent composition of the present invention include sodium lauryl sulfate, alkylsulfonates, sorbitan monostearate, sorbitan monolaurate and commercially available flourosurfactants such as Du Pont FSO fluorosurfactant marketed by E. I. DuPont de Nemours and Company of Wilmington, Delaware, and fluoroalkyl esters such as ZONYL FSN-100 and FSO-100 also marketed by E. I. DuPont de Nemours and Company of Wilmington, Del.

The water based water repellent composition of the present invention desirably contain an effective amount of an anti-static agent. While any anti-static agent compatible with the water repellent compound and the surfactant employed in the formulation of the water based water repellent composition can be employed, desirable results have been obtained wherein the anti-static agent is an organosilane containing an a quaternary ammonium salt moiety represented by the general formula

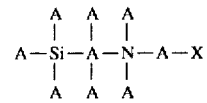

wherein Si is silicon; N is nitrogen; X is a anion moiety and A is selected from the group consisting of an alkyl group containing from about 1 to about 30 carbon atoms, an alkoxy group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms, with the proviso that at least one A is an alkoxy group.

An example of an organosilane containing a quaternary ammonium salt moiety satisfying the above-identified formula and which can be employed as the anti-static component of the water based water repellent compositions of the present invention is octadecylaminodimethyltrimethoxysilylpropylammonium chloride.

The amount of the anti-static compound incorporated into the water based water repellent composition can very widely and will be dependent to a large degree upon the intended used of the cellulose containing materials treated with the water based water repellent composition, as well as the environmental conditions to which the treated cellulose containing materials are exposed. Generally, however, the anti-static compound will be employed in an amount sufficient to provide from about 0.1 to about 1 percent by volume of the anti-static agent in the water based water repellent composition.

It is often desirable to reduce the combustibility of the cellulose containing materials while increasing the water resistance of such materials. In such instances, an effective amount of a fire retardant compound can be incorporated into the water based water repellent composition of the present invention so as to produce a resulting composition capable of reducing the combustibility of the cellulose containing materials to which the water based water repellent composition is applied. The fire retardant compound incorporated into the water based water repellent composition of the present invention must be compatible with the water repellent compounds present in the water based water repellent composition and with the cellulose containing material to which the water based water repellent composition containing such fire retardant compound is applied.

"Compatible with the cellulose containing material" as used herein means that the water based water repellent composition containing a fire retardant compound will chemically attach to the cellulose containing material.

"Fire retardant compound" as used herein means a compound, when incorporated into the water based water repellent composition, provides a composition which when applied to cellulose containing materials results in treated cellulose containing materials which will not burn, or such treated materials will burn to a lesser degree than untreated materials, or the burning of such treated materials will be limited to a smaller area when compared to untreated materials.

Fire retardant compounds satisfying the above-stated requirements are silanes represented by the general formula:

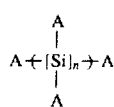

and siloxanes are represented by the general formula:

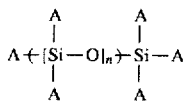

wherein Si is silicon; O is oxygen; n is a positive integer; and A is selected from the group consisting essentially of H, R or X, Y, Q or D. H is a hydrogen atoms, with the proviso that at least one A is X and at least one A is selected from the group of Y, Q or D;

R is selected from the group consisting of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains from 1 to about 8 carbon atoms and the alkenyl substituent contains up to about 8 carbon atoms;

X is selected from a group consisting of a halogen, hydroxyl group, RO group wherein O is oxygen, RNR or RNH wherein N is nitrogen, or carboxylic group;

Y is selected from the group consisting of an alkyl group containing from about 1 to about 30 carbon atoms, an alkenyl group, an aryl group, a cycloalkyl group, a cycloalkenyl group, an arylalkyl group, an arylalkenyl group, or any substituted group thereof wherein the cyclo substituent contains from about 4 to about 8 carbon atoms, the alkyl substituent contains up to about 8 carbon atoms and the alkenyl substituent contains up to about 8 carbon atoms. Y is substituted with at least one bromine atom or at least one iodine atom;

Q is selected from a group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms. Q is substituted with at least one —EHxR$_b$ group, wherein when x+b=1, the E is (E)$_m$ wherein m is an integer of 1–5 and E is sulfur or selenium, when x+b=2, then E is aluminum, phosphorus or arsenic, and when x+b=3, the E is silicon, germanium, or tin; and D is selected from a group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof wherein the cyclo substituent contains from about 4 to about 8 carbon atoms, the alkyl substituent contains up to about 8 carbon atoms and the alkenyl substituent contains up to about 8 carbon atoms. D is substituted with at least one moiety comprising an element capable of forming a covalent bond with carbon having an average bond energy of 72 kcal/mol or less.

It should be noted that the fire retardant compound may be a mixture of the above defined silanes and siloxanes. Further, the repeating A group on the formula shown above, that is, the A group attached to the silicon atom within the bracket when n is greater than 1, may repeat the H, R, X, Y, Q or D groups in any order. For example, when n=3, the formula becomes (using A' and A" to designate the repeating A groups):

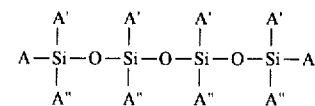

In the fire retardant compound incorporated into the water based water repellent composition of the present invention, all of the A's do not have to be the same group and all of the A"s do not have to be the same group, but are selected from the group comprising H, R, X, Y, Q or D groups in any order wherein H, R, X, Y Q and D are as previously defined.

The fire retardant compound present in the water based water repellent composition of the present invention must contain at least one group which chemically attaches the fire retardant compound to the cellulose containing material. The group in the above-defined fire retardant compound which chemically reacts with bonds in the cellulose containing material to form covalent linkages is designated as X wherein X is a halogen, hydroxyl, or carboxylic acid group, an OR group, or RNR or RNH wherein N is nitrogen, O is oxygen and R is as previously described. An example would be the reaction:

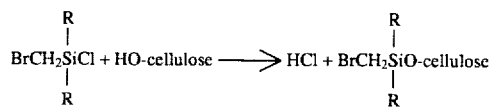

in which the silicon containing grouping becomes attached to the cellulose via a covalent bond.

A second example would be:

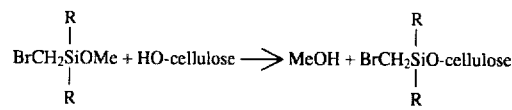

in which methanol is liberated. In these examples the active fire retardant moiety of the fire retardant compound, i.e. BrCH$_2$—, becomes attached to the cellulose containing material via an SiO linkage. It should be noted that the fire retardant grouping is not a part of nor attached to an X-group since during the attachment process X no longer remains with the cellulose containing material.

The water based water repellent composition containing the above-identified fire retardant compound penetrates into the cellulose containing material and provides an extensive treatment depth. This is an improvement over compositions which simply coat the surface of a cellulose containing material since the coating may flake, wear, or leach in rain or during cleaning. Therefore, the water based water repellent composition of the present invention containing the above-identified fire retardant compound is an improvement over salts that are used to saturate cellulose containing materials such as wood shingles, since the salts leach during rain storms or during cleaning of the wood shingles.

While the mechanism of the fire retardent compound is not fully understood, it is believed that the fire retardant moiety of the fire retardant compound may work by releasing at least a portion of the fire retardant moiety from the water based water repellent composition, e.g., a Br or (C$_6$H$_5$)$_2$P, as a free radical in order to combine with free radicals in the fire to retard the propagation or initiation of a fire or to extinguish a fire.

In order to release the free radicals from the fire retardant moiety of the fire retardant compound in the water based water repellent composition as described herein, the average bond energy between a carbon atom within the fire retardant moiety and the moiety attached thereto capable of becoming the free radical should be about 72 kcal/mol or less. Thus, the fire retardant moiety is desirably selected from a group of elements capable of forming a covalent bond with carbon with an average bond energy of about 72 kcal/mol or less. Examples of these elements are silicon, phosphorus, sulfur, germanium, arsenic, selenium, bromine, tin, iodine, and lead. Standard references in this field may be referred to in order to determine the average bonding energy between carbon and the groups utilized in accordance with the present invention not listed herein.

Therefore, the fire retardant moiety of the fire retardant compound employed in the water based water repellent composition of the present invention is any moiety having at least one carbon atom capable of attaching to the silicon atom of the silane or siloxane fire retardant compounds represented by the general formulas previously described, and a substituent attached to a carbon within the free radical when exposed to conditions conducive to burning of the cellulose containing material. Examples of fire retardant moieties in accordance with the present invention are described hereafter as groups Y, D and Q.

Y is selected from a group consisting of an alkyl group containing from 1 to about 30 carbon atoms, an alkenyl group, an aryl group, a cycloalkenyl group, an arylalkyl group, an arylalkenyl group, or any substituted group thereof wherein the cyclo substituent contains from about 4 to 8 carbon atoms, the alkyl substituent contains from 1 to about 8 carbon atoms, wherein Y is substituted with at least one bromine atom substituent or at least one iodine atom substituent. A preferred Y would be the 1,2-dibromoethyl($BrCH_2CHBr-$) grouping.

Q is selected from a group consisting of an alkyl group containing from 1 to about 30 carbon atoms, an alkenyl group, an aryl group, a cycloalkenyl group, an arylalkyl group, an arylalkenyl group, or any substituted group thereof wherein the cyclo substituent contains from about 4 to 8 carbon atoms, the alkyl substituent contains from 1 to about 8 carbon atoms, wherein Q is substituted with at least one —$EH_xR_r$ group substituent, wherein when x+b=1, then E is (E)m, wherein m is an integer of 1–5 and E is sulfur or selenium, when x+b=2, the E is aluminum, phosphorus, or arsenic, and when x+b–3, then E is silicon, germanium, or tin. A preferred Q would have a sulfur substituent of the type —SR or a phosphorus substituent of the type —$EH_xR_r$ where x+r 2. More preferably, Q would include a 4-phenylthiobutyl grouping or the 2-(diphenylphosphino)ethyl grouping.

D is selected from a group consisting of an alkyl group containing from about 1 to about 30 carbon atoms, an alkenyl group, an aryl group, a cycloalkenyl group, an arylalkyl group, an arylalkenyl group, or any substituted group thereof wherein the cyclo substituent contains from about 4 to 8 carbon atoms, the alkyl substituent contains from 1 to about 8 carbon atoms, wherein D is substituted with at least one substituent comprising an element capable of forming a covalent bond with carbon having an average bond energy of 72 kcal/mol or less.

The groupings described as Q or D may comprise substituents such as —SSR or —$SiHRSiR_3$ or other multi E groupings. The fire retardant compound employed in the water based water repellent composition of the present invention may have one or more E elements, R groups, Y groups, Q groups, or D groups. The addition of more than one E, R, Y, Q or D group to the fire retardant compound could have a synergistic effect to enhance fire retardant properties of the water based water repellent composition.

The amount of the fire retardant compound incorporated into the water based water repellent composition of the present invention can vary widely and will generally be dependent on the properties desired in treated cellulose containing materials, the manner in which such treated cellulose containing materials are used and the amount and chemical properties of the water repellent compound present in the water based water repellent composition. Generally, however, desirable water repellent and fire retardant properties can be imparted to cellulose containing materials treated with the water based water repellent compositions containing a fire retardant compound when the water based water repellent composition employed to treat such materials contains from about 5 to about 20 percent by volume of a fire retardant compound as described herein.

In formulating the water based water repellent composition of the present invention a water repellent compound and a surfactant are admixed with water to provide and aqueous emulsion containing from about 2.5 to about 20 percent by volume of the water repellent compound and from about 0.1 to about 1 percent by volume of the surfactant. An effective amount of an anti-static compound is then admixed with the aqueous emulsion to provide a water based water repellent composition containing, in addition to from about 2.5 to about 20 percent by volume of the water repellent compound and from about 0.1 to about 1 percent by volume of the surfactant, from about 0.1 to about 1 percent by volume of the anti-static compound.

In order to enhance the fire retardant properties as well as the water repellent properties of cellulose containing materials treated with the water based water repellent composition of the present invention, an effective amount of a fire retardant compound can be incorporated into the water based water repellent composition. The amount of fire retardant compound can vary widely, but generally the effective amount of the fire retardant compound incorporated into the water based water repellent composition is an amount sufficient to provide the water based water repellent composition with from about 5 to about 20 percent by volume of the fire retardant compound.

The cellulose containing material is treated with the water based water repellent composition of the present invention (including the water based water repellent compositions containing an effective amount of a fire retardant compound) by contacting the cellulose containing material with the composition or by immersion of the material into the composition. The water based water repellent composition may also be applied to the cellulose containing material by spraying, brushing or rolling the composition onto the cellulose containing material. The water based water repellent composition of the present invention can be applied to the cellulose containing material in vacuo (less than atmospheric pressure), at atmospheric pressure, or greater than atmospheric pressure.

The type of treatment will, in part, depend upon the type and size of the cellulose containing material, the intended use of the treated cellulose containing material as well as the extent of exposure of the treated cellulose containing material to the weather, the degree of fire retardant properties sought in the treated cellulose containing material, and the duration of the fire retardant activity of the water based water repellent composition sought in the treated material.

Depending upon the density and/or porosity of the cellulose containing material, the factors cited herein, and the concentration of the of the water repellent compound and/or fire retardant compound present in the water based water repellent composition, the application rate of the water based water repellent composition may be as high as 400 square feet per gallon or as low as 50 square feet per gallon.

The water based water repellent composition of the present invention, when applied to a cellulose containing material, chemically attaches to the cellulose containing material. One of the advantages of the present invention is that the chemical attachment of the water based water repellent composition to the cellulose containing material permits the composition to remain attached to the material for longer periods of time, especially under conditions such as exposure to weather conditions.

In another embodiment of the present invention, the water repellent composition is a solvent based water repellent composition utilizing a solvent medium or carrier. The solvent based water repellent composition contains, in addition to the solvent medium, an effective amount of a fluoropolymer, an effective amount of a silica/titanate compound compatible with the solvent carrier and the fluoropolymer and an effective minor amount of an anti-static agent which is compatible with the fluoropolymer and the silica/titanate compound and which is capable of bonding to the cellulose containing material.

Solvents which can be used in the formulation of the solvent based water repellent composition of the present invention are well know and include hydrocarbons, alcohols, glycols and organic solvents such as mineral spirits, a blend of petroleum oils and solvents having a flash point within the range of from about 100 to about 110 degrees F. While any solvent compatible with the fluoropolymer, the silica/titanate compound and the anti-static agent can be employed as the solvent carrier in the formulation of the solvent based water repellent composition of the present invention, desirable results have been obtained where the solvent in mineral spirits.

The fluoropolymer, in combination with the silica/titanate compound, functions as the water repellent component of the solvent based water repellent composition. Thus, the fluoropolymer and the silica/titanate compound must be compatible with the cellulose containing material and capable of bonding to such cellulose containing material so as to impart desired water repellency thereto.

Fluoropolymers which can be employed in combination with the silica/titanate compound as the water repellent compound of the solvent based water repellent composition disclosed herein can be characterized as perfluoroalkanes wherein almost all or all hydrogen atoms have been replaced with fluorine atoms and includes a perfluoro alcohol/alkyl condensate such as Milease F-89 marketed by Zeneca Inc. of Wilmington, Del.

Silica/ titanate compounds which can be employed in combination with the above-described fluoropolymers as the water repellent constituent of the solvent based water repellent composition disclosed herein can be characterized as silicone polymers and includes trimethylated silica/tetraisopropoxy titanate, a mixture of inorganic and organic compounds marketed by Dow Corning Corporation of Wilmington, Del. under the tradename C2-0563.

The amount of the fluoropolymer and the amount of the silica/ titanate compound employed as the water repellent constituent in the formulation of the solvent based water repellent composition of the present invention can vary widely and will be generally dependent upon the nature and properties of the fluoropolymer and the silica/titanate compound, as well as the properties of the cellulose containing material to which the solvent based water repellent composition is to be applied. Generally, however, desirable results can be obtained wherein the fluoropolymer is present in the solvent based water repellent composition in an amount of the from about 1.5 to about 5 percent by volume and the silica/titanate compound is present in the solvent based water repellent composition in an amount of from about 0.5 to about 5 percent by volume.

As previously stated, the solvent based water repellent composition of the present invention contains, in addition to the water repellent constituent consisting of the fluoropolymer and the silica/titanate compound, an effective minor amount of an anti-static agent. While any anti-static agent compatible with the solvent medium, the fluoropolymer and the silica/titanate compound employed in the formulation of the solvent based water repellent composition can be employed, desirable results have been obtained wherein the anti-static agent is an organosilane containing an a quaternary ammonium salt moiety represented by the general formula

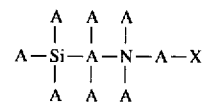

wherein Si is silicon; N is nitrogen; X is a anion moiety and A is selected from the group consisting of an alkyl group containing from about 1 to about 30 carbon atoms, an alkoxy group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms, with the proviso that at least one A is an alkoxy group in the anti-static composition.

An example of an organosilane containing a quaternary ammonium salt moiety satisfying the above-identified formula and which can be employed as the anti-static component of the water based water repellent compositions of the present invention is octadecylaminodimethyltrimethoxysilylpropylammonium chloride.

The amount of the anti-static compound incorporated into the solvent based water repellent composition can very widely and will be dependent to a large degree upon the intended used of the cellulose containing materials treated with the solvent based water repellent composition, as well as the environmental conditions to which the treated cellulose containing materials are exposed. Generally, however, the anti-static compound will be employed in an amount sufficient to provide the solvent based water repellent composition with from about 0.1 to about 1 percent by volume of the anti-static agent.

To enhance ultraviolet stabilization of cellulose containing materials treated with the solvent based water repellent composition and thus substantially reduce undesired darkening of the treated cellulose containing materials due to exposure to ultraviolet radiation, it is often desirable to incorporate into the solvent based water repellent composition an effective minor amount of an ultraviolet light stabilizer. While the amount of ultraviolet light stabilizer employed can vary widely, generally the ultraviolet light stabilizer will be employed in an amount of sufficient to provide the solvent based water repellent composition with from about 0.1 to about 2 percent by volume of the ultraviolet light stabilizer.

Any ultraviolet light stabilizer compatible with the fluoropolymer and silica/titanate compound constituting the water repellent constituents of the solvent based water repellent composition of the present invention can be employed. Examples of such ultraviolet light stabilizers are 2-2'-hydroxy-5-methylphenylbenzotriazole, 2-(2H-benxotriazole-2-yl)-4methylphenyl, 2-(2'-hydroxy-3',6'-di-tert-amylphenyl)benzotriazole, beta-3-(3-2H-benzotriazol-2-YL)-4-hydroxy-5-tert-butylphenyl), propionic acid, methyl ether, polyethylene glycol 300 and hindered tertiary amines, such as bis(1,2,2,6,6-pentamethyl-4-piperidinyl) sebacate.

Depending on the solvent and ultraviolet light stabilizer employed in the formulation of the solvent based water repellent composition of the present invention, it may be desirable to dissolve or disperse the ultraviolet light stabilizer in an effective minor amount of an aromatic solvent prior to introduction of the ultraviolet light stabilizer into the solvent based water repellent composition. The effective minor amount of the aromatic solvent employed can vary widely, but will generally be an amount sufficient to provide from about 1 to about 5 percent by volume of the aromatic solvent in the solvent based water repellent composition.

Any aromatic solvent compatible with the solvent employed as the carrier or medium for the solvent based water repellent composition can be employed provided such aromatic solvent is compatible with the water repellent components of the solvent based water repellent composition and the ultraviolet light stabilizer. An example of an aromatic solvent satisfying the before stated requirements is AS#200, an aromatic solvent marketed by Moon Chemical of Oklahoma City, Okla., and the like.

It is often desirable to reduce the combustibility of the cellulose containing materials while increasing the water repellency of such materials treated with the solvent based water repellent composition of the present invention. In such instances, an effective amount of a fire retardant compound can be incorporated into the solvent based water repellent composition so that the solvent based water repellent composition, in addition to imparting water repellent properties to cellulose containing materials, is capable of reducing the combustibility of the cellulose containing materials. The fire retardant compound incorporated into the solvent based water repellent composition of the present invention must be compatible with the fluoropolymer and silica/titanate compound present in the solvent based water repellent composition, as well as the cellulose containing material to which the solvent based water repellent composition containing such fire retardant compound is applied.

The term "compatible with the cellulose containing material" as used herein means that the solvent based water repellent composition containing a fire retardant compound will chemically attach to the cellulose containing material. The term "fire retardant compound" as used herein means a compound, when incorporated into the solvent based water repellent composition, provides a solvent based water repellent composition which, when applied to cellulose containing materials, produces treated cellulose containing materials which will not burn, or such treated materials will burn to a lesser degree than untreated materials, or the burning of such treated materials will be limited to a smaller area when compared to untreated materials.

Fire retardant compounds satisfying the above-stated requirements are silanes represented by the general formula:

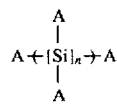

and siloxanes are represented by the general formula:

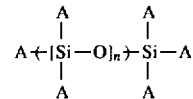

wherein Si is silicon; O is oxygen; n is a positive integer; and A is selected from the group consisting essentially of H, R or X, Y, Q or D. H is a hydrogen atoms, with the proviso that at least one A is X and at least one A is selected from the group of Y, Q or D;

is selected from the group consisting of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains from 1 to about 8 carbon atoms and the alkenyl substituent contains up to about 8 carbon atoms;

X is selected from a group consisting of a halogen, hydroxyl group, RO group wherein 0 is oxygen, RNR or RNH wherein N is nitrogen, or carboxylic group;

Y is selected from the group consisting of an alkyl group containing from about 1 to about 30 carbon atoms, an alkenyl group, an aryl group, a cycloalkyl group, a cycloalkenyl group, an arylalkyl group, an arylalkenyl group, or any substituted group thereof wherein the cyclo substituent contains from about 4 to about 8 carbon atoms, the alkyl substituent contains up to about 8 carbon atoms and the alkenyl substituent contains up to about 8 carbon atoms. Y is substituted with at least one bromine atom or at least one iodine atom;

Q is selected from a group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms. Q is substituted with at least one —$EH_xR_b$ group, wherein when x+b=1, the E is $(E)_m$ wherein m is an integer of 1–5 and E is sulfur or selenium, when x+b=2, then E is aluminum, phosphorus or arsenic, and when x+b=3, the E is silicon, germanium, or tin; and D is selected from a group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof wherein the cyclo substituent contains from about 4 to about 8 carbon atoms, the alkyl substituent contains up to about 8 carbon atoms and the alkenyl substituent contains up to about 8 carbon atoms. D is substituted with at least one moiety comprising an element capable of forming a covalent bond with carbon having an average bond energy of 72 kcal/mol or less.

It should be noted that the fire retardant compound may be a mixture of the above defined silanes and siloxanes. Further, the repeating A group on the formula shown above, that is, the A group attached to the silicon atom within the bracket when n is greater than 1, may repeat the H, R, X, Y, Q or D groups in any order. For example, when n=3, the formula becomes (using A' and A" to designate the repeating A groups):

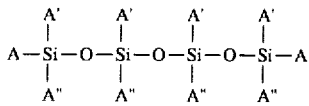

In the fire retardant compound incorporated into the solvent based water repellent composition of the present invention, all of the A's do not have to be the same group and all of the A"s do not have to be the same group, but are selected from the group comprising H, R, X, Y, Q or D groups in any order wherein H, R, X, Y Q and D are as previously defined.

The fire retardant compound present in the solvent based water repellent composition of the present invention must have at least one attachment group which chemically attaches the fire retardant compound to the cellulose containing material. The attachment group in the above-defined fire retardant compound which chemically reacts with bonds in the cellulose containing material to form covalent linkages is designated as X wherein X is a halogen, hydroxyl, or carboxylic acid group, an OR group, or RNR or RNH wherein N is nitrogen, O is oxygen and R is as previously described. An example would be the reaction:

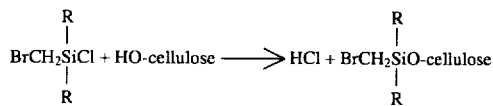

in which the silicon containing grouping becomes attached to the cellulose via a covalent bond.

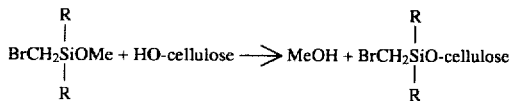

in which methanol is liberated. In these examples the active fire retardant moiety of the fire retardant compound, i.e. $BrCH_2-$, becomes attached to the compatible combustible material via an SiO linkage. It should be noted that the fire retardant grouping is not a part of nor attached to an X-group since during the attachment process X no longer remains with the compatible combustible material.

The solvent based water repellent composition containing the above-identified fire retardant compound penetrates into the cellulose containing material and provides an extensive treatment depth. This is an improvement over compositions which simply coat the surface of a cellulose containing material since the coating may flake off, wear off, or leach off in rain or during cleaning. Therefore, the solvent based water repellent composition of the present invention containing the above-identified fire retardant compound is an improvement over salts that are used to saturate cellulose containing materials such as wood shingles, since the salts leach during rain storms or during cleaning of the wood shingles.

While the mechanism of the fire retardant compound is not fully understood, it is believed that the fire retardant moiety of the fire retardant compound may work by releasing at least a portion of the fire retardant moiety from the solvent based water repellent composition, e.g., a Br or $(C_6H_5)_2P$, as a free radical in order to combine with free radicals in the fire to retard the propagation or initiation of a fire or to extinguish a fire.

In order to release the free radicals from the fire retardant moiety of the fire retardant compound in the solvent based water repellent composition as described herein, the average bond energy between a carbon atom within the fire retardant moiety and the moiety attached thereto capable of becoming the free radical should be about 72 kcal/mol or less. Thus, the fire retardant moiety is desirably selected from a group of elements capable of forming a covalent bond with carbon with an average bond energy of about 72 kcal/mol or less. Examples of these elements are silicon, phosphorus, sulfur, germanium, arsenic, selenium, bromine, tin, iodine, and lead. Standard references in this field may be referred to in order to determine the average bonding energy between carbon and the groups utilized in accordance with the present invention not listed herein.

Therefore, the fire retardant moiety of the fire retardant compound employed in the solvent based water repellent composition of the present invention is any moiety having at least one carbon atom capable of attaching to the silicon atom of the silane or siloxane fire retardant compounds represented by the general formulas previously described, and a substituent attached to a carbon within the free radical when exposed to conditions conducive to burning of the cellulose containing material. Examples of fire retardant moieties in accordance with the present invention are described hereafter as groups Y, D and Q.

Y is selected from a group consisting of an alkyl group containing from 1 to about 30 carbon atoms, an alkenyl group, an aryl group, a cycloalkenyl group, an arylalkyl group, an arylalkenyl group, or any substituted group thereof wherein the cyclo substituent contains from about 4 to 8 carbon atoms, the alkyl substituent contains from 1 to about 8 carbon atoms, wherein Y is substituted with at least one bromine atom substituent or at least one iodine atom substituent. A preferred Y would be the 1,2-dibromoethyl($BrCH_2CHBr-$) grouping.

Q is selected from a group consisting of an alkyl group containing from 1 to about 30 carbon atoms, an alkenyl group, an aryl group, a cycloalkenyl group, an arylalkyl group, an arylalkenyl group, or any substituted group thereof wherein the cyclo substituent contains from about 4 to 8 carbon atoms, the alkyl substituent contains from 1 to about 8 carbon atoms, wherein Q is substituted with at least one $-EH_xR^b$ group substituent, wherein when x+b=1, then E is (E)m, wherein m is an integer of 1–5 and E is sulfur or selenium, when x+b=2, the E is aluminum, phosphorus, or arsenic, and when x+b=3, then E is silicon, germanium, or tin. A preferred Q would have a sulfur substituent of the type $-SR$ or a phosphorus substituent of the type $-EH_xR_b$, where x+r=2. More preferably, Q would include a 4-phenylthiobutyl grouping or the 2-(diphenylphosphino)ethyl grouping.

D is selected from a group consisting of an alkyl group containing from about 1 to about 30 carbon atoms, an alkenyl group, an aryl group, a cycloalkenyl group, an arylalkyl group, an arylalkenyl group, or any substituted group thereof wherein the cyclo substituent contains from about 4 to 8 carbon atoms, the alkyl substituent contains from 1 to about 8 carbon atoms, wherein D is substituted with at least one substituent comprising an element capable of forming a covalent bond with carbon having an average bond energy of 72 kcal/mol or less.

The groupings described as Q or D may comprise substituents such as $-SSR$ or $-SiHRSiR_2$ or other multi E groupings. The fire retardant compound employed in the solvent based water repellent composition of the present invention may have one or more E elements, R groups, Y groups, Q groups, or D groups. The addition of more than one E, R, Y, Q or D group to the fire retardant compound could have a synergistic effect to enhance fire retardant properties of the solvent based water repellent composition.

The amount of the fire retardant compound incorporated into the solvent based water repellent composition of the present invention can vary widely and will generally be dependent on the properties desired in treated cellulose containing materials, the manner in which such treated cellulose containing materials are used and the amount and chemical properties of the water repellent components present in the solvent based water repellent composition. Generally, however, desirable water repellent and fire retardant properties can be imparted to cellulose containing materials treated with the solvent based water repellent composition containing a fire retardant compound when the solvent based water repellent composition employed to treat such materials contains from about 5 to about 20 percent by volume of a fire retardant compound as described herein.

In formulating the solvent based water repellent composition of the present invention, the fluoropolymer, the silica/titanate compound and the anti-static agent are admixed with a compatible solvent to form a solvent based water repellent composition desirably containing from about 1.5 to about 5 percent by volume of the fluoropolymer, from about 0.5 to about 5 percent by volume of the silica/titanate compound and from about 0.1 to about 1 percent by volume of the anti-static agent. To incorporated an ultraviolet light stabilizer into the solvent based water repellent composition to substantially reduce discoloration of treated cellulose containing materials due to exposure to ultraviolet light radiation, an ultraviolet light stabilizer is admixed with an effective amount of an aromatic solvent and an effective amount of the resulting admixture is then incorporated into the solvent based water repellent composition so that the solvent based water repellent composition contains from about 1 to about 5 percent by volume of the resulting admixture which contains from about 0.5 to about 5 percent by weight of the ultraviolet light stabilizer.

In order to enhance the fire retardant properties as well as the water retardant properties of cellulose containing materials treated with the solvent based water repellent composition of the present invention, an effective amount of a fire retardant compound can be incorporated into the solvent based water repellent composition so as to provide such composition with from about 5 to about 20 percent by volume of the fire retardant compound.

The cellulose containing material is treated with the solvent based water repellent composition of the present invention (including the solvent based water repellent composition containing an effective amount of a fire retardant compound) by contacting the cellulose containing material with the composition or by immersion of the material into the composition. The solvent based water repellent composition may also be applied to the cellulose containing material by spraying, brushing or rolling the composition onto the cellulose containing material. The solvent based water repellent composition of the present invention can be applied to the cellulose containing material in vacuo (less than atmospheric pressure), at atmospheric pressure, or greater than atmospheric pressure.

The type of treatment will, in part, depend upon the type and size of the cellulose containing material, the intended use of the treated cellulose containing material as well as the extent of exposure of the treated cellulose containing material to the weather, the degree of fire retardant properties sought in the treated cellulose containing material, and the duration of the fire retardant activity of the solvent based water repellent composition sought in the treated material. For example, with thin cellulose containing materials that are not exposed to weather conditions, brushing the solvent based water repellent composition on the cellulose containing material may suffice. Or, if the cellulose containing material is highly susceptible to fire conditions and is exposed to weather conditions (such as wood shingles), a greater degree of penetration of the solvent based water repellent composition into the cellulose containing material may be sought in order to enhance the fire retardant properties of the treated material. This greater degree of penetration may be achieved by contacting the cellulose containing material with the solvent based water repellent composition for a longer period of time, treating the cellulose containing material with the solvent based water repellent composition under pressure exceeding atmospheric pressure, i.e., treating the cellulose containing material in a pressurized chamber, or pressurized spraying of the cellulose containing material with the solvent based water repellent composition or by treating the cellulose containing material in a vacuum. The pressure employed in treating the cellulose containing material with the solvent based water repellent composition of the present invention is that amount of pressure (above or below atmospheric pressure) which will provide the appropriate amount of penetration of the solvent based water repellent composition into the cellulose containing material to provide the treated cellulose containing material with the desired water repellent and fire retardant properties.

Depending upon the density and/or porosity of the cellulose containing material, the factors cited herein, and the concentration of the water repellent compounds and/or fire retardant compound present in the solvent based water repellent composition, the application rate of the solvent based water repellent composition may be as high as 400 square feet per gallon or as low as 50 square feet per gallon. For example, rough cedar can be effectively treated with the solvent based water repellent composition of the present invention by spraying the solvent based water repellent composition on the surface of the rough cedar at the rate of about 250 square feet per gallon. However, because the application rates may vary widely depending on the properties of the cellulose containing material and the concentration of the water repellent and/or fire retardant compounds present in the solvent based water repellent composition, the present invention is not limited to the foregoing application rates.

The solvent based water repellent composition of the present invention, when applied to a cellulose containing material, chemically attaches to the cellulose containing material. One of the advantages of the solvent based water repellent composition of the present invention is that the chemical attachment of the solvent based water repellent composition to the cellulose containing material permits the solvent based water repellent composition to remain attached to the cellulose containing material for longer periods of time, especially under conditions such as exposure to weather conditions.

In another embodiment of the present invention, a water repellent composition is provided which utilizes water as the medium or carrier and which contains an effective amount of a fluoropolymer water repellent compound and minor effective amounts of a bleaching agent, a detergent and a surfactant. The fluoropolymer employed must be compatible with the cellulose containing material and capable of bonding to such cellulose containing material so as to impart desired water repellency thereto; and the bleaching agent, the detergent and the surfactant must be compatible with the fluoropolymer water repellent compound and capable of enhancing the wetting properties of the fluoropolymer water retardant compound.

The amount of the fluoropolymer water repellent compound, the amount of the bleaching agent and the amounts of the detergent and surfactant employed in the formulation of the water repellent composition of the present invention can vary widely and will be generally dependent upon the nature and properties of the fluoropolymer water repellent compound, as well as the properties of the cellulose containing material to which the water repellent composition is applied. Generally, however, desirable results can be obtained wherein the water repellent composition contains from about 2.5 to about 20 percent by volume of the fluoropolymer water repellent compound and from about 79 to about 94.9 percent by volume of an aqueous solution containing from about 3 to about 10 weight percent of a bleaching agent, from about 0.5 to about 5 weight percent of a detergent and from about 0.1 to about 1 percent by volume of a surfactant.

Fluoropolymers which can be employed as the water retardant compound in the formulation of the water repellent composition of the present invention can be characterized as perfluoroalkanes or alkenes wherein all or almost all hydrogen atoms of the hydrocarbon have been replaced with fluorine atoms and include a perfluoro alcohol/alkyl condensate such as Milease F-89 marketed by Zeneca Inc. of Wilmington, Del.

The bleaching agent employed in the formulation of the water repellent composition of the present invention can be any bleaching agent which is compatible with the fluoropolymer water repellent compound and the cellulose containing material to which the water repellent composition is applied. Bleaching agents satisfying the before-stated criteria include sodium hypochlorite.

The detergent employed in the formulation of the water repellent composition of the present invention can be any detergent which is compatible with the fluoropolymer water repellent compound, which is soluble in water and which does not produce a visible residue when the water repellent composition is applied to a cellulose containing material. The surfactant employed in the formulation of the water repellent composition of the present invention can be any surfactant which is compatible with the fluoropolymer water repellent compound, the bleaching agent and the detergent and which is capable of enhancing the wetting properties of the water repellent compound. However, desirable results have been obtained wherein the surfactant is an anionic surfactant, and more desirably an anionic fluorosurfactant. Examples of surfactants satisfying the above-stated requirements and which can be employed as the surfactant constituent in the formulation of the water based water repellent composition of the present invention include sodium lauryl sulfate, alkylsulfonates, sorbitan monostearate, sorbitan monolaurate and commercially available flourosurfactants such as Du Pont FSO fluorosurfactant and fluoroalkyl esters such as ZONYL FSN-100 and FSO-100 also marketed by E. I. DuPont de Nemours and Company of Wilmington, Del.

In formulating the water repellent composition of the present invention, the fluoropolymer and the surfactant are admixed with an aqueous solution containing the bleaching agent and the detergent. The water repellent composition can then be employed to treat the cellulose containing material. For example, the cellulose containing material can be treated with the bleach containing water repellent composition of the present invention by contacting the cellulose containing material with the composition or by immersion of the cellulose containing material into the composition. The water repellent composition may also be applied to the cellulose containing material by spraying, brushing or rolling the composition onto the cellulose containing material. The water repellent composition of the present invention can also be applied to the cellulose containing material in vacuo (less than atmospheric pressure), at atmospheric pressure, or greater than atmospheric pressure.

The type of treatment of the cellulose containing material with the water repellent composition will, in part, depend upon the type and size of the cellulose containing material and the intended use of the treated cellulose containing material as well as the extent of exposure of the treated cellulose containing material to the weather. For example, with thin cellulose containing materials that are not exposed to weather conditions, brushing the water repellent composition on the cellulose containing material may suffice. Or, if the cellulose containing material is highly exposed to weather conditions such as cedar siding or trim, a greater degree of penetration of the water repellent composition into the cellulose containing material may be sought in order to maintain the natural appearance of such cellulose containing material. This greater degree of penetration may be achieved by contacting the cellulose containing material with the water repellent composition for a longer period of time, treating the cellulose containing material with the water repellent composition under pressure exceeding atmospheric pressure (such as treating the cellulose containing material in a pressurized chamber) or pressurized spraying of the cellulose containing material with the water repellent composition or by treating the cellulose containing material in a vacuum. The pressure employed in treating the cellulose containing material with the water repellent composition of the present invention is that amount of pressure (above or below atmospheric pressure) which will provide the appropriate amount of penetration of the water repellent composition into the cellulose containing material to provide the treated cellulose containing material with the desired water repellent properties.

Depending upon the density and/or porosity of the cellulose containing material, the factors cited herein, and the concentration of the water repellent compound present in the water repellent composition, the application rate of the water repellent composition may be as high as 400 square feet per gallon or as low as 50 square feet per gallon. For example, rough cedar can be effectively treated with the water repellent composition of the present invention by spraying the water repellent composition on the surface of the rough cedar at the rate of about 250 square feet per gallon. However, because the application rates may vary widely depending on the properties of the cellulose containing material and the concentration of the water repellent compound present in the water repellent composition, the present invention is not limited to the foregoing application rates.

The water repellent composition of the present invention, when applied to a cellulose containing material, chemically attaches to the cellulose containing material. One of the advantages of the water repellent composition of the present invention is that the chemical attachment of the water repellent composition to the cellulose containing material permits the water repellent composition to remain attached to the cellulose containing material for longer periods of time, especially under conditions such as exposure to weather conditions.

19

In the following examples cedar wood specimens were treated with the water repellent compositions of the present invention to evaluated the water repellency properties of the treated specimens both before and after weathering and thereby determine anticipated performance and service life of the water repellent compositions of the present invention. The test method used to evaluate water repellency of the treated cedar wood specimens was in substantial accordance with ASTM D 5401-93, Standard Test Method for Evaluating Clear Water Repellent Coatings on Wood.

In order to further illustrate the present invention, the following examples are given. However, it is to be understood that the examples are for illustrative purposes only and are not to be construed as limiting the scope of the present invention.

EXAMPLE I

A water based water repellent composition was formulated by admixing the following constituents in the amounts specified with water to form a substantially homogeneous, stable water based water repellent composition.

| Constituent | Volume percent |
| --- | --- |
| perfluoro alcohol/alkyl condensate emulsion (Milease F-89 marketed by Zeneca Inc., Wilmington, Delaware) | 5 |
| Aminoethylaminopropyl dimethyl siloxane emulsion (Dow Corning 84 Additive marketed by Dow Corning Corporation, Wilmington, Delaware) | 3 |
| Anionic silicone latices emulsion (Dow Corning 84 Additive marketed by Dow Corning Corporation, Wilmington, Delaware) | 3 |
| Octadecylaminodimethyltrimethoxysilylpropyl ammonium chloride | 0.5 |
| Fluorosurfactant (FSO fluorosurfactant marketed by E. I. DuPont de Nemours and Company, Wilmington, Delaware) | 0.25 |

Prior to treatment of the test specimens with the water based water repellent composition prepared in accordance with the procedure set forth above, the test specimens were weigh on two successive days to ensure constant weight.

The water based water repellent composition was then applied to two cedar wood specimens at an application rate of 150 square feet per gallon. The treated cedar wood specimens were then allowed to air dry on a raised screen rack for 24 hours.

The dried, treated test specimens, together with a control specimen, were then tested for water repellency both before and after weathering in accordance with the following procedure.

PROCEDURE

The treated test specimens, along with the untreated control specimen, were placed in a conditioning chamber until they reached constant weight. The test specimens and the control specimen were then weighed and their weights recorded. All weight measurements of the test specimen and the control specimen were taken on an electronic balance sensitive to 0.01 gram.

The treated test specimens and the untreated control specimen were then placed in a container of water maintained at 73.5°±3.5° F. (23°±2° C.) and allow to float for 15 min, then the specimens were turned over and allowed to float for another 15 min to give a total immersion time of 30 min.

The specimens were then removed from the water, allowed to drain, wiped with a slightly dampened cloth to remove excess water, reweighed and their weights recorded.

In order to determine the water repellent properties of the treated test specimen after weathering, the treated test specimen and the control specimen were placed in an accelerated weathering chamber for 72 hours.

Water repellent efficiency (WRE) of the treated test specimens, both before and after weathering, as compared to the control specimens, was determined as follows:

Water Repellent Efficiency (WRE)=100[(A−B)−(C−D)]/(A−B)

where:

A=weight of the untreated specimen after water contact.
B=weight of the untreated specimen before water contract.
C=weight of the treated specimen after water contact.
D=weight of the treat specimen before water contact.

Using the above defined formula, the mean WRE value for the test specimens was calculated as follows:

| Treated Test Specimens | Before Weathering | 76.71 |
| --- | --- | --- |
| | After Weathering | 91.38 |
| Control (Before and after Weathering) | | 0 |

EXAMPLE II

The water based water repellent composition of Example I was diluted with 50 volume percent water and the diluted composition was tested to determine its water repellent efficiency, both before and after weathering, in accordance with the procedures set forth in Example I. The mean water repellent efficiency for the diluted composition was calculated as follows:

| Treated Test Specimens | Before Weathering | 74.06 |
| --- | --- | --- |
| | After Weathering | 91.87 |

EXAMPLE III

A solvent based water repellent composition was formulated by admixing the following constituents in the amounts specified with mineral spirits.

| Constituent | Volume percent |
| --- | --- |
| perfluoro alcohol/alkyl condensate emulsion (Milease F-89 marketed by Zeneca Inc., Wilmington, Delaware) | 4 |
| trimethylated silica/tetraisopropoxy titanate (Dow Corning C2-0563 marketed by Dow Corning Corporation, Wilmington, Delaware) | 2 |
| Octadecylaminodimethyltrimethoxysilylpropyl ammonium chloride | 0.5 |

In order to enhance the weathering properties of the solvent based water repellent composition, an effective amount of 2-(2-hydroxy-5-t-octylphenyl)-benzotriazole, an ultraviolet light stabilizer, was admixed with an aromatic solvent (AS 200 marketed by Moon Chemical of Oklahoma City, Okla.) to provide a resulting admixture which, when incorporated into the solvent based water repellent composition provided a solvent based water repellent composition containing about 0.5 percent by weight of the 2-(2-hydroxy-5-t-octylphenyl)-benzotriazole and 3 percent by volume of the aromatic solvent.

The solvent based water repellent composition was then tested in accordance with the procedures set forth in Example I to determine its water repellent efficiency, both before and after weathering. The mean water repellent efficiency for the solvent based water repellent composition was calculated as follows:

| Treated Test Specimens | Before Weathering | 89.85 |
|---|---|---|
| | After Weathering | 92.02 |

EXAMPLE IV

The solvent based water repellent composition of Example III was diluted with 50 volume percent mineral spirits and the diluted composition was tested to determine its water repellent efficiency, both before and after weathering, in accordance with the procedures set forth in Example I. The mean water repellent efficiency for the diluted composition was calculated as follows:

| Treated Test Specimens | Before Weathering | 89.19 |
|---|---|---|
| | After Weathering | 91.87 |

EXAMPLE V

An effective amount of 1,2-dibromoethyltrimethoxysilane was incorporated into the solvent based water repellent composition of Example III to determine the effect on the water repellent efficiency of the solvent based water repellent composition when a fire retardant compound is incorporated into the solvent based water repellent composition. The effective amount of the of 1,2-dibromoethyltrimethoxysilane employed was an amount sufficient to provide the solvent based water repellent composition with 10 percent by volume of the 1,2-dibromoethyltrimethoxysilane.

The solvent based water repellent composition containing 10 percent by volume of 1,2-dibromoethyltrimethoxysilane was then tested to determine its water repellent efficiency, both before and after weathering, in accordance with the procedures set forth in Example I. The mean water repellent efficiency for the solvent based water repellent composition containing 10 percent by volume of 1,2-dibromoethyltrimethoxysilane was calculated as follows:

| Treated Test Specimens | Before weathering | 88.13 |
|---|---|---|
| | After Weathering | 91.60 |

EXAMPLE VI

An effective amount of a second fire retardant compound, namely 1,3,3-tribromopropyltrimethoxysilane, was incorporated into the solvent based water repellent composition of Example III to determine its effect on the water repellent efficiency of the solvent based water repellent composition. The effective amount of 1,3,3-tribromopropyltrimethoxysilane employed was an amount sufficient to provide the solvent based water repellent composition with 10 percent by volume of the 1,3,3-tribromopropyltrimethoxysilane.

The solvent based water repellent composition containing 10 percent by volume of 1,3,3-tribromopropyltrimethoxysilane was then tested to determine its water repellent efficiency, both before and after weathering, in accordance with the procedures set forth in Example I. The mean water repellent efficiency for the solvent based water repellent composition containing 10 percent by volume of 1,3,3-tribromopropyltrimethoxysilane was calculated as follows:

| Treated Test Specimens | Before Weathering | 91.40 |
|---|---|---|
| | After weathering | 88.94 |

The foregoing example clearly illustrate the water repellent efficiency of the water based water repellent composition and the solvent based water repellent composition of the present invention. Further, the test specimens treated with such compositions exhibited substantially uniform penetration and/or bonding of the water repellent compositions to the test specimens which resulted in less darkening of the treated test specimens upon weathering and substantially no deterioration of water repellent properties of such treated test specimens due to swelling of the treated test specimens resulting from exposure to the elements.

Changes may be made to the elements of the compositions or in the steps or the sequence of steps of the methods described herein without departing from the spirit and the scope of the invention as defined in the following claims.

What is claimed is:

1. A water based water repellent composition for rendering cellulose containing materials water repellent, the water based water repellent composition consisting essentially of:

water;

from about 2.5 to about 20 percent by volume of a water repellent compound compatible with the cellulose containing material, wherein the water repellent compound comprises a mixture of a fluoropolymer capable of providing a beading effect when water is applied to the cellulose containing material treated with the water repellent composition, an anionic silicone possessing organo-functional characteristics which enhance bonding of the water repellent composition to the cellulose containing material., and an amino-functional siloxane capable possessing water repellent properties wherein the amino-functional siloxane is represented by the general formula:

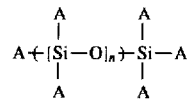

wherein Si is silicon; O is oxygen; n is a positive integer; and A is selected from the group consisting essentially of H, R or X;

H is a hydrogen atom;

R is selected from the group consisting essentially of an alkyl group containing from about 1 to about 30 carbon atoms, an alkenyl group, an aryl group, a cycloalkyl group, a cycloalkenyl group, at an arylalkenyl, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein O is oxygen, a carboxylic group, or RNR or RNH wherein N is nitrogen; and with the proviso that at least one A is X, and at least one A is R; and from about 0.1 to about 1 percent by volume of a surfactant compatible with the water repellent compound and capable of enhancing the wetting properties of the water repellent compound.

2. The water based water repellent composition of claim 1 further including from about 0.1 to about 1 percent by volume of an antistatic agent compatible with the water repellent compound and the surfactant.

3. The water based water repellent composition of claim 1 wherein the fluoropolymer is a perfluoro alcohol/alkyl condensate, the anionic silicone is a self cross-linking silicone latices and the amino-functional siloxane is represented by the general formula

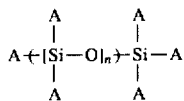

wherein Si is silicon; O is oxygen; n is a positive integer; and A is selected from the group consisting essentially of H, R or X wherein H is a hydrogen atom;

R is selected from the group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein O is oxygen, a carboxylic group, or RNR or RNH wherein N is nitrogen; and with the proviso that at least one A is X, and at least one A is R in the composition.

4. The water based water repellent composition of claim 1 further including from about 5 to about 20 percent by volume of a fire retardant composition compatible with the water repellent compound and the surfactant and which is capable of chemically attaching to the cellulose containing material.

5. The water based water repellent composition of claim 4 wherein the fire retardant composition comprises a silane, a siloxane or a combination thereof wherein the silane is represented by the general formula

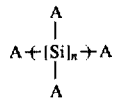

and wherein the siloxane is represented by the general formula

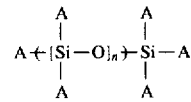

wherein Si is silicon; O is oxygen; n is a positive integer; and A is selected from the group consisting essentially of H, R, X or Y wherein H is a hydrogen atom;

R is selected from the group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein O is oxygen, a carboxylic group, or RNR or RNH wherein N is nitrogen; and Y is selected from a group consisting essentially of an alkyl group containing from about 1 to about 30 carbon atoms, an alkenyl group, an aryl group, a cycloalkyl group, a cycloalkenyl group, an arylalkyl group, an arylalkeny group, or any substituted group thereof, wherein the cyclo substituent contains from about 4 to about 8 carbon atoms, the alkyl substituent contains up to about 8 carbon atoms and the alkeny substituent contains up to about 8 carbon atoms, wherein Y is substituted with at least one bromine atom or at least one iodine atom, with the proviso that at least one A is X, and at least one A is Y in the composition and the Y group is connected to a silicon atom of the silane or siloxane formula by a carbon atom, and wherein the silicon fire retardant composition containing moiety is substantially chemically bonded to the wood, paper or cellulose containing material and the Y group is substantially chemically bonded to the silicon moiety whereby the Y group substantially cannot be removed from the silicon moiety by water washing.

6. A water based water repellent composition for rendering cellulose containing materials water repellent, the water based water repellent composition consisting essentially of:

water;

from about 2.5 to about 20 percent by volume of a water repellent compound compatible with the cellulose containing materials;

from about 0.1 to about 1 percent by volume of a surfactant compatible with the water repellent compound and capable of enhancing the wetting properties of the water repellent compound wherein the water repellent compound comprises a mixture containing from about 1.3 to about 9 percent by volume of a perfluoro alcohol/alkyl condensate, from about 0.6 to about 5.5 percent by volume of an anionic silicone, and from about 0.6 to about 5.5 percent by volume of an amino-functional siloxane represented by the general formula

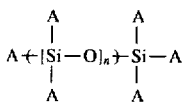

wherein Si is silicon; O is oxygen; n is a positive integer; and A is selected from the group consisting essentially of H, R or X;

H is a hydrogen atom;

R is selected from the group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein O is oxygen, a carboxylic group, or RNR or RNH wherein N is nitrogen; and with the proviso that at least one A is X, and at least one A is R.

7. The water based water repellent composition of claim 6 further including from about 0.1 to about 1 percent by volume of an antistatic agent compatible with the fluoropolymer, the anionic silicone and the amino-functional siloxane.

8. The water based water repellent composition of claim 7 wherein the anti-static agent is a silane represented by the general formula

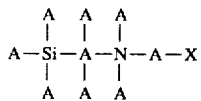

wherein Si is silicon; N is nitrogen; X is a anion moiety and A is selected from the group consisting of an alkyl group containing from about 1 to about 30 carbon atoms, an alkoxy group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about. 8 carbon atoms, with the proviso that at least one A is an alkoxy group.

9. The water based water repellent composition of claim 6 further including from about 0.1 to about 1 percent by volume of an antistatic agent compatible with the perfluoro alcohol/alkyl condensate, the anionic silicone, the amino-functional siloxane and the surfactant.

10. The water based water repellent composition of claim 6 wherein the amino-functional siloxane is aminoethylaminopropyl dimethyl siloxane.

11. A method for producing a water based water repellent composition compatible with wood, paper and cellulose containing materials and capable of enhancing the water repellent properties of the wood, paper and cellulose containing materials, the method comprising:

admixing water, a water repellent compound compatible with the wood, paper and cellulose containing materials and a surfactant compatible with the water repellent compound and capable of enhancing the wetting properties of the water repellent compound to form a water based water repellent composition consisting essentially of from about 2.5 to about 20 percent by volume of the water repellent compound and from about 0.1 to about 1 percent by volume of the surfactant wherein the water repellent compound comprises a mixture of a fluoropolymer capable of providing a beading effect when water is applied to wood, paper and cellulose containing materials treated with the water repellent composition, an anionic silicone possessing organofunctional characteristics which enhances bonding of the water repellent composition to the wood, paper and cellulose containing materials, and an amino-functional siloxane possessing water repellent properties wherein the aminofunctional siloxane is represented by the general formula:

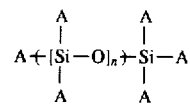

wherein Si is silicon; O is oxygen; n is a positive integer; and A is selected from the group consisting essentially of H, R or X;

H is a hydrogen atom;

R is selected from the group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms;

x is selected from a group consisting of a halogen, hydroxyl group, OR group wherein O is oxygen, a carboxylic group, or RNR or RNH wherein N is nitrogen; and with the proviso that at least one A is X, and at least one A is R.

12. The method of claim 11 further comprising incorporating into the water based water repellent composition from about 0.1 to about 1 percent by volume of an anti-static agent compatible with the water repellent compound and the surfactant.

13. The method of claim 11 further comprising incorporating into the water based water repellent composition from about 0.1 to about 1 percent by volume of an anti-static agent compatible with the fluoropolymer, the anionic silicone and the amino-functional siloxane.

14. The method of claim 13 further comprising incorporating into the water based water repellent composition containing an anti-static agent from about 5 to about 20 percent by volume of a fire retardant compound compatible with the water repellent compound and the surfactant and which is capable of chemically attaching to the wood, paper or cellulose containing material.

15. The method of claim 14 wherein the fire retardant compound comprises a silane, a siloxane or a combination thereof wherein the silane is represented by the general formula:

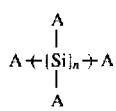

and wherein the siloxane is represented by the general formula

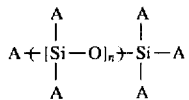

wherein Si is silicon; O is oxygen; n is a positive integer; and A is selected from the group consisting essentially of H, R, X or Y wherein H is a hydrogen atom;

R is selected from the group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein O is oxygen, a carboxylic group, or RNR or RNH wherein N is nitrogen; and Y is selected from a group consisting essentially of an alkyl group containing from about 1 to about 30 carbon atoms, an alkenyl group, an aryl group, a cycloalkyl group, a cycloalkenyl group, an arylalkyl group, an arylalkeny group, or any substituted group thereof, wherein the cyclo substituent contains from about 4 to about 8 carbon atoms, the alkyl substituent contains up to about 8 carbon atoms and the alkeny substituent contains up to about 8 carbon atoms, wherein Y is substituted with at least one bromine atom or at least one iodine atom, with the proviso that at least one A is X, and at least one A is Y in the composition and the Y group is connected to a silicon atom of the silane or siloxane formula by a carbon atom, and wherein the silicon fire retardant composition containing moiety is substantially chemically bonded to the wood, paper or cellulose containing material and the Y group is substantially chemically bonded to the silicon moiety whereby the Y group substantially cannot be removed from the silicon moiety by water washing.

16. A method for producing a water based water repellent composition compatible with wood, paper and cellulose containing materials and capable of enhancing the water repellent properties of the wood, paper and cellulose containing materials, the method comprising:

admixing water, a water repellent compound compatible with the wood, paper or cellulose containing materials and a surfactant compatible with the water repellent compound and capable of enhancing the wetting properties of the water repellent compound to form a water based water repellent composition consisting essentially of from about 2.5 to about 20 percent by volume of the water retardant compound and from about 0.1 to about 1 percent by volume of the surfactant wherein the water repellent compound comprises from about 1.3 to about 9 percent by volume of a perfluoro alcohol/alkyl condensate, from about 0.6 to about 5.5 percent by volume of an anionic silicone, and from about from about 0.6 to about 5.5 percent by volume of an amino-functional siloxane represented by the general formula:

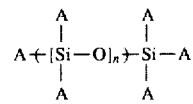

wherein Si is silicon; O is oxygen; n is a positive integer; and A is selected from the group consisting essentially of H, R or X wherein H is a hydrogen atom;

R is selected from the group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein O is oxygen, a carboxylic group, or RNR or RNH wherein N is nitrogen; and with the proviso that at least one A is X, and at least one A is R in the composition.

17. The method of claim 16 further comprising incorporating into the water based water repellent composition from about 0.1 to about 1 percent by volume of an anti-static agent compatible with the perfluoro alcohol/alkyl condensate, the anionic silicone, the amino-functional siloxane and the surfactant.

18. The method of claim 17 wherein the amino-functional siloxane is aminoethylaminopropyl dimethyl siloxane.

19. The method of claim 16 further comprising incorporating into the water based water repellent composition an effective amount of a fire retardant compound compatible with the water repellent compound and the surfactant and which is capable of chemically attaching to the cellulose containing material to provide the water based water repellent composition with from about 5 to about 20 percent by volume of the fire retardant compound.

20. The method of claim 19 wherein the fire retardant compound comprises a silane, a siloxane or a combination thereof wherein the silane is represented by the general formula:

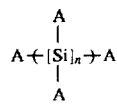

and wherein the siloxane is represented by the general formula:

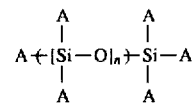

wherein Si is silicon; O is oxygen; n is a positive integer; and A is selected from the group consisting essentially of H, R, X or Y wherein H is a hydrogen atom;

R is selected from the group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein O is oxygen, a carboxylic group, or RNR or RNH wherein N is nitrogen; and Y is selected from a group consisting essentially of an alkyl group containing from about 1 to about 30 carbon atoms, an alkenyl group, an aryl group, a cycloalkyl group, a cycloalkenyl group, an arylalkyl group, an arylalkeny group, or any substituted group thereof, wherein the cyclo substituent contains from about 4 to about 8 carbon atoms, the alkyl substituent contains up to about 8 carbon atoms and the alkeny substituent contains up to about 8 carbon atoms, wherein Y is substituted with at least one bromine atom or at least one iodine atom, with the proviso that at least one A is X, and at least one A is Y in the composition and the Y group is connected to a silicon atom of the silane or siloxane formula by a carbon atom, and wherein the silicon fire retardant composition containing moiety is substantially chemically bonded to the wood, paper or cellulose containing material and the Y group is substantially chemically bonded to the silicon moiety whereby the Y group substantially cannot be removed from the silicon moiety by water washing.

21. A method for treating wood, paper and a cellulose containing material comprising the step of applying a water repellent composition to at least one surface of the wood, paper and cellulose containing material wherein the water repellent composition consists essentially of:

water;

from about 2.5 to about 20 percent by volume of a water repellent compound compatible with the wood, paper and cellulose containing material; and from about 0.1 to about 1 percent by volume of a surfactant compatible with the water repellent compound and capable of enhancing the wetting properties of the water retardant compound wherein the water repellent compound is a mixture of a fluoropolymer capable of providing a beading effect when water is applied to wood, paper and a cellulose containing material treated with the water repellent composition, an amino-functional siloxane possessing water repellent properties and a self cross-linking silicone capable of enhancing bonding of the water repellent composition to the wood, paper and cellulose containing materials.

22. The method of claim 21 wherein the water repellent compound further includes from about 0.1 to about 1 percent by volume of an anti-static agent compatible with the water repellent compound and the surfactant.

23. The method of claim 22 wherein the fluoropolymer is a perfluoro alcohol/alkyl condensate.

24. The method of claim 21 wherein the water repellent composition further includes from about 0.1 to about 1 percent by volume of an anti-static agent compatible with the fluoropolymer, the self cross-linking anionic silicone and the amino-functional siloxane.

25. The method of claim 24 wherein the anti-static agent is a silane represented by the general formula:

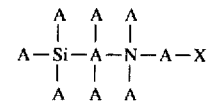

wherein Si is silicon; N is nitrogen; X is a anion moiety and A is selected from the group consisting of an alkyl group containing from about 1 to about 30 carbon atoms, an alkoxy group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms, with the proviso that at least one A is an alkoxy group.

26. The method of claim 25 wherein the silane is octadecylaminodimethoxysilylpropyl ammonium chloride.

27. A method for treating wood, paper or a cellulose containing material comprising the step of applying a water repellent composition to at least one surface of the wood, paper or cellulose containing material wherein the water repellent composition consists essentially of:

water;

from about 2.5 to about 20 percent by volume of a water repellent compound compatible with the wood, paper or cellulose containing material;

from about 0.1 to about 1 percent by volume of a surfactant compatible with the water repellent compound and capable of enhancing the wetting properties of the water retardant compound wherein the water retardant compound comprises from about 1.3 to about 9 percent by volume of a perfluoro alcohol/alkyl condensate, from about 0.6 to about 5.5 percent by volume of an anionic silicone, and from about 0.6 to about 5.5 percent by volume of an amino-functional siloxane represented by the general formula:

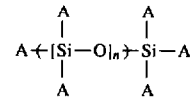

wherein Si is silicon; O is oxygen; n is a positive integer; and A is selected from the group consisting essentially of H, R or X;

H is a hydrogen atom;

R is selected from the group consisting essentially of an alkyl group containing from about 1 to about 30 carbon atoms, and alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein O is oxygen, a carboxylic group, or RNR or RNH wherein N is nitrogen; and with the proviso that at least one A is X, and at least one A is R.

28. The method of claim 27 wherein the water repellent composition further includes from about 0.1 to about 1 percent by volume of an anti-static agent compatible with the perfluoro alcohol/alkyl condensate, the anionic silicone, the amino-functional siloxane and the surfactant.

29. The method of claim 28 wherein the amino-functional siloxane is aminoethylaminopropyl dimethyl siloxane.

30. The method of claim 27 wherein the water repellent compound further includes from about 5 to about 20 percent by volume of a fire retardant compound compatible with the water repellent compound and the surfactant and which is capable of chemically attaching to the wood, paper or cellulose containing material.

31. The method of claim 30 wherein the fire retardant compound comprises a silane, a siloxane or a combination thereof wherein the silane is represented by the general formula:

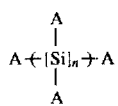

and wherein the siloxane is represented by the general formula

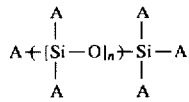

wherein Si is silicon; O is oxygen; n is a positive integer; and A is selected from the group consisting essentially of H, R, X or Y wherein H is a hydrogen atom;

R is selected from the group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein O is oxygen, a carboxylic group, or RNR or RNH wherein N is nitrogen; and Y is selected from a group consisting essentially of an alkyl group containing from about 1 to about 30 carbon atoms, an alkenyl group, an aryl group, a cycloalkyl group, a cycloalkenyl group, an arylalkyl group, an arylalkeny group, or any substituted group thereof, wherein the cyclo substituent contains from about 4 to about 8 carbon atoms, the alkyl substituent contains up to about 8 carbon atoms and the alkeny substituent contains up to about 8 carbon atoms, wherein Y is substituted with at least one bromine atom or at least one iodine atom, with the proviso that at least one A is X, and at least one A is Y in the composition and the Y group is connected to a silicon atom of the silane or siloxane formula by a carbon atom, and wherein the silicon fire retardant composition containing moiety is substantially chemically bonded to the wood, paper or cellulose containing material and the Y group is substantially chemically bonded to the silicon moiety whereby the Y group substantially cannot be removed from the silicon moiety by water washing.

* * * * *

UNITED STATES PATENT AND TRADEMARK OFFICE
CERTIFICATE OF CORRECTION

PATENT NO. : 5,593,483            Page 1 of 3
DATED : January 14, 1997
INVENTOR(S) : Dean E. Brunken It is certified that error appears in the above-identified patent and that said Letters Patent is hereby corrected as shown below:

Column 1, line 42, after 'In', please delete "the", and substitute therefor --one--.

Column 3, line 11, please delete "cross-liking", and substitute therefor --cross-linking--.

Column 3, line 53, please delete "surfacEants", and substitute therefor --surfactants--.

Column 4, line 4, after 'containing', please delete "an".

Column 5, line 15, please delete "atoms", and substitute therefor --atom--.

Column 10, line 4, after 'amount', please delete "of".

Column 10, line 5, before 'from', please delete "the".

Column 10, line 17, after 'containing', please delete "an".

Column 10, line 47, please delete "used", and substitute therefor --use--.

Column 12, line 15, please delete "atoms", and substitute therefor --atom--.

UNITED STATES PATENT AND TRADEMARK OFFICE
CERTIFICATE OF CORRECTION

PATENT NO. : 5,593,483
DATED : January 14, 1997
INVENTOR(S) : Dean E. Brunken

It is certified that error appears in the above-identified patent and that said Letters Patent is hereby corrected as shown below:

Column 12, line 18, before 'is selected', please insert --R--.

Column 15, line 28, please delete "incorporated", and substitute therefor --incorporate--.

Column 19, line 44, please delete "weigh", and substitute therefor --weighed--.

Column 20, line 21, please delete "treat", and substitute therefor --treated--.

Column 22, line 13, please delete "illustrate", and substitute therefor --illustrates--.

UNITED STATES PATENT AND TRADEMARK OFFICE
CERTIFICATE OF CORRECTION

PATENT NO. : 5,593,483
DATED : January 14, 1997
INVENTOR(S) : Dean E. Brunken

It is certified that error appears in the above-indentified patent and that said Letters Patent is hereby corrected as shown below:

Column 22, line 60, after 'cycloalkenyl group,' please delete "at".

Column 28, line 4, after 'and', please delete "from about".

Column 30, line 33, after 'containing material;', please insert --and--.

Signed and Sealed this

Eighth Day of July, 1997

BRUCE LEHMAN

Attest:

Attesting Officer

Commissioner of Patents and Trademarks